United States Patent
De Coninck

(10) Patent No.: US 6,858,245 B2
(45) Date of Patent: Feb. 22, 2005

(54) AGGLOMERATED STARCH-BASED PRODUCT FOR FOOD PREPARATIONS

(75) Inventor: Valère Leopold Marie Pierre De Coninck, Antwerp (BE)

(73) Assignee: Cerestar Holding B.V. (NL)

( * ) Notice: Subject to any disclaimer, the term of this patent is extended or adjusted under 35 U.S.C. 154(b) by 326 days.

(21) Appl. No.: 09/887,022

(22) Filed: Jun. 25, 2001

(65) Prior Publication Data

US 2002/0014180 A1 Feb. 7, 2002

(30) Foreign Application Priority Data

Jun. 24, 2000 (GB) .............................................. 0015417

(51) Int. Cl.$^7$ ........................................... A23L 1/0522
(52) U.S. Cl. ........................ 426/578; 426/596; 426/658; 426/661
(58) Field of Search ................................ 426/594, 596, 426/658, 661, 578; 127/33

(56) References Cited

U.S. PATENT DOCUMENTS

| | | |
|---|---|---|
| 3,464,857 A | 9/1969 | Marotta et al. |
| 4,156,020 A | 5/1979 | Bohrmann et al. |
| 4,415,599 A | 11/1983 | Bos |
| 4,704,294 A | 11/1987 | Rakosky |
| 4,741,910 A * | 5/1988 | Karwowski et al. ......... 426/285 |
| 4,980,193 A * | 12/1990 | Tuason et al. .............. 426/654 |
| 5,597,603 A * | 1/1997 | Cha et al. ................... 426/573 |
| 6,001,408 A * | 12/1999 | Dudacek et al. ............ 426/516 |
| 6,200,623 B1 * | 3/2001 | Dudacek et al. ............ 426/578 |
| 6,217,931 B1 * | 4/2001 | Meister ...................... 426/594 |
| 6,312,756 B1 * | 11/2001 | Dudacek et al. ............ 426/661 |
| 6,410,075 B1 * | 6/2002 | Dudacek et al. ............ 426/578 |
| 6,413,567 B1 * | 7/2002 | Dudacek et al. ............ 426/578 |
| 6,586,034 B2 * | 7/2003 | Meister et al. .............. 426/593 |

FOREIGN PATENT DOCUMENTS

EP           0 490 557 A1    6/1992

OTHER PUBLICATIONS

Search Report—European Patent Office—GBA 0015417.

* cited by examiner

*Primary Examiner*—N. Bhat
(74) *Attorney, Agent, or Firm*—Fitch, Even, Tabin & Flannery

(57) ABSTRACT

An agglomerated starch-based product and a dry mixes based thereon are provided suitable for preparing instant food preparations. The agglomerated starch-based product is a homogeneous powder wherein each powder particle is an agglomeration of randomly distributed fine grains of starch and maltodextrin. The agglomerated starch-based product is readily dispersible in aqueous fluids and develops un full viscosity instantaneously.

20 Claims, 3 Drawing Sheets

AGGLOMERATED STARCH-BASED PRODUCT FOR FOOD PREPARATIONS

TECHNICAL FIELD

The present invention relates to an agglomerated starch-based product based on starch and maltodextrin, and dry mixes for food preparations containing the agglomerated starch-based product. When poured into a liquid, the agglomerated starch-based product disperses easily and develops its full viscosity instantaneously. Dry mixes comprising agglomerated starch-based product are particularly useful for preparing instant food preparations wherein the instant development of the viscosity is essential.

BACKGROUND OF THE INVENTION

Instant mixes, containing fully pregelatinised starch, are increasingly popular due to their convenience. These instant mixes are dispersed in an aqueous fluid, such as cold water and milk, are agitated and are allowed to set for a certain time. Up to now emphasis has been put mainly on the improvement of the dispersibility of the instant mixes.

EP 0 517 423 relates to a dry hydrocolloid-containing composition that when hydrated readily disperses in cold aqueous fluids. The readily-dispersible hydrocolloid-containing food material is produced by spray-drying particles of the hydrocolloid with an aqueous solution of a wetting agent to agglomerate and spray-coat the particles. The wetting agent must be a water-soluble food-acceptable ingredient with little or no emulsifying capability and typical examples of such wetting agent are triacetin, glycerol, and tributyrin. The level of wetting agent which is applied to the surface of the materials being agglomerated is about 0.1% to 3% of the wetting agent by weight of the hydrocolloid material.

U.S. Pat. No. 4,871,398 is directed to a continuous process for producing gelatinised, spray-dried and agglomerated starch which has a relatively narrow particle size distribution and a relatively low level of fine particles. The invention relates to a specially designed spray nozzle system which produces agglomerated pregelatinised, spray-dried starch without the need for separate agglomeration equipment. The thus produced starch material will typically contain agglomerates sized up to about 200 microns.

U.S. Pat. No. 5,597,603 relates to a dry sugar-free instant pudding mix which is adapted for rehydration with skim milk or low-fat milk to produce sugar-free, no/low-fat puddings. The dry mix of this invention comprises agglomerated pregelatinised starch, maltodextrin, non-sugar sweetener, phosphate gelling agents, xanthan gum and slow-reacting calcium salts. The aim of the invention is to provide sugar-free, fat-free instant pudding mix which upon hydration with skim milk produces puddings which exhibits setting and textural parameters comparable to those exhibited by instant puddings made with whole (fat-containing) milk.

U.S. Pat. No. 3,464,857 relates to a method for the preparation of a water dispersible dry starch composition. In said method a starch base is blended with a sugar component such as monosaccharides and disaccharides, followed by mixing with water and simultaneously drying said blend and gelatinising the starch base, and grinding the dried mixture. It becomes possible to readily disperse the resulting instant starch product without the formation of lumps.

U.S. Pat. No. 4,704,294 relates to an agglomerated dry mix composition suitable for addition to a boiling or hot mixture of water and meat or poultry fat drippings to make a lump-free gravy. Said agglomerated dry mix composition comprises a retarded potato starch thickening agent, a binding amount of maltodextrin, flavors, colors, and an emulsifying agent.

EP 0 490 557 relates to a composition suitable for use as gum arabic replacement and characterised in that said composition comprises a mixture of an extruded waxy starch, a low DE maltodextrin and enzymatically hydrolysed collagen.

U.S. Pat. No. 4,156,020 relates to a process for producing a dry product for food preparations which readily and easily swell and dissolve in water or aqueous liquids without forming lumps. The product is present in the form of agglomerates in which the starch particles are the nuclei and are surrounded by or embedded in a protective layer of hydrophilic substance. The hydrophilic substances are sugars such as lactose, sucrose, dextrose glucose syrup and maltodextrin; sugar alcohols such a sorbitol and mannitol; organic acids; inorganic salts such as sodium chloride, sodium glutamate or mixtures thereof.

There exists a need for a thickening agent based on starch, which is incorporated in dry mixes for instant food preparations wherein the starch-based product is readily dispersible in water and the full viscosity of the thickener is developed instantaneously.

The current invention provides such a product.

SUMMARY OF THE INVENTION

The present invention relates to an agglomerated starch-based product consisting of starch and maltodextrin, wherein at least 80% w/w of the discrete particles are greater than 100 microns and characterised in that each powder particle is an agglomeration of randomly distributed fine grains of starch and maltodextrin, and said agglomerated starch-based product instantly disperses and simultaneously develops its full viscosity in a cold water-containing liquid medium. The present invention relates to an agglomerated starch-based product characterised in that the full viscosity of this product in cold milk is developed in less than 10 minutes, preferably in less than 8 minutes, more preferably in less than 5 minutes.

The present invention further relates to an agglomerated starch-based product wherein maltodextrin is present in an amount of from 5% w/w to 95% w/w on dry base of the agglomerated starch-based product, preferably from 10% w/w to 75% w/w, more preferably from 15% w/w to 50% w/w, most preferably in an amount of from 15% w/w to 40% w/w.

The current invention further describes dry mixes for making food preparations containing an agglomerated starch-based product consisting of starch and maltodextrin with at least 80% w/w of the discrete particles of said agglomerated starch-based product greater than 100 microns, and wherein each particle is an agglomeration of randomly distributed fine grains of starch and maltodextrin, and said agglomerated starch-based product instantly disperses and simultaneously develops its full viscosity in a cold water-containing liquid medium.

The present invention relates to dry mixes containing the agglomerated starch-based product in an amount of from 10% w/w to 99% w/w, preferably from 10% w/w to 95% w/w, more preferably from 10% w/w to 80% w/w on dry base. These dry mixes are applied in food compositions selected from the group consisting of instant bakery products, dairy products, instant sauces, soups, instant desserts and drink powders.

Furthermore, the invention relates to a dry pudding mix comprising the agglomerated starch-based product from 20% w/w to 80% w/w, preferably from 40% w/w to 70% w/w, more preferably from 50% w/w to 60% w/w, and said agglomerated starch-based product comprises from 15% w/w to 40% w/w maltodextrin.

The agglomerated starch-based product can be produced by spray-cooking, roll-drying or agglomeration in fluid bed dryer, preferably by spray-cooking.

The spray-cooking process for preparing these starches is characterised in that the spray-drying tower inlet temperature, steam pressure and correct ratio of steam to starch slurry and maltodextrin are selected for obtaining a homogeneous powder wherein each particle is an agglomeration of randomly distributed fine grains of starch and maltodextrin.

DETAILED DESCRIPTION OF THE INVENTION

The present invention relates to an agglomerated starch-based product consisting of starch and maltodextrin with at least 80% w/w of the discrete particles greater than 100 microns and characterised in that each particle is an agglomeration of randomly distributed fine grains of starch and maltodextrin, and said agglomerated starch-based product instantly disperses and simultaneously develops its full viscosity in a cold water-containing liquid medium.

Figure 1:
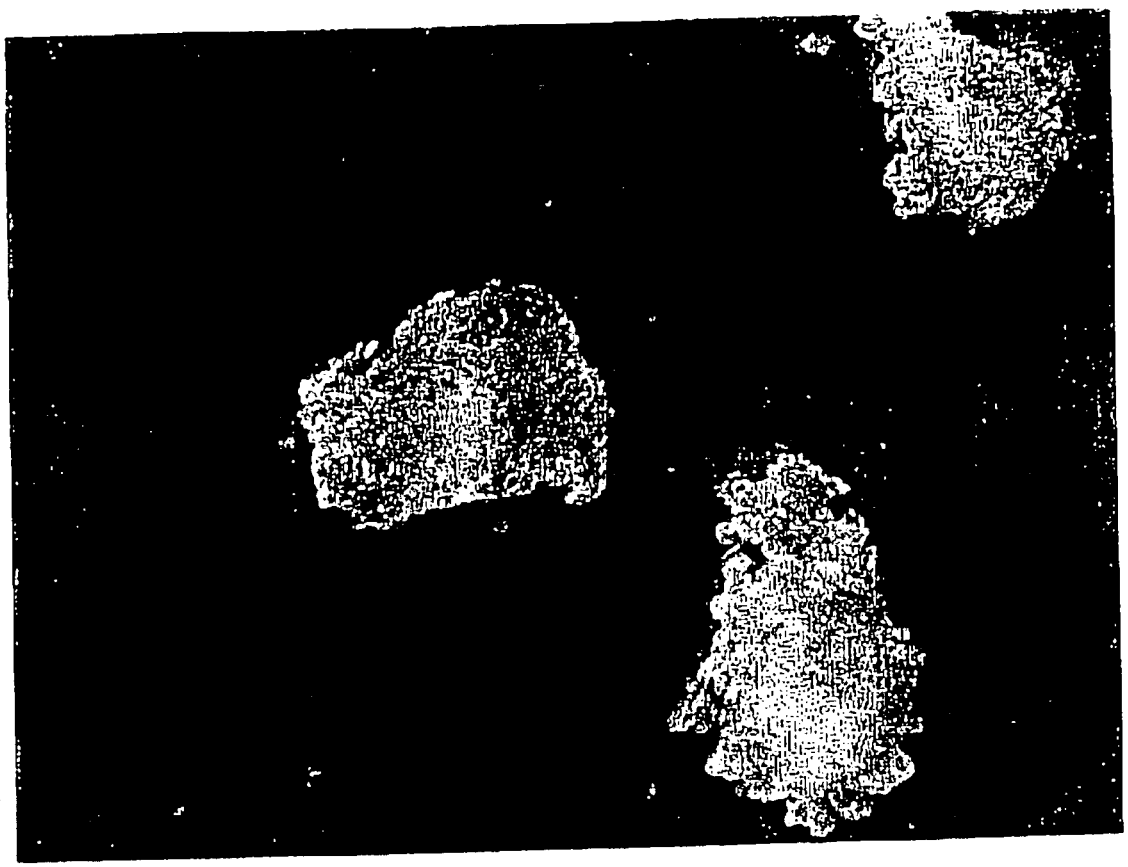
FIG. 1 is a picture, taken with Wild Heerbrugg optical macroscope (=binocular with reflection) (with magnification of 50×) of agglomerated starch-based product comprising 30% w/w maltodextrin DE 15. Stabilised light (Zeiss KL 1500 electronic) is used to enlighten the dry powder and the discrete particles with irregular shape are seen. The random distribution of the maltodextrin in the agglomerated starch-based product is clearly observed.

The powder characteristics are determined with a Wild Heerbrugg optical macroscope. Dry powder is applied on the observation plate and enlightened with stabilised light (Zeiss KL 1500 electronic). With a magnification of 50× discrete particles with irregular shape and the random distribution of the maltodextrin in the agglomerated starch-based product are clearly observed (FIG. 1).

Further powder characteristics are determined by the particle size distribution.

The agglomerated starch-based product instantly disperses and develops its full viscosity simultaneously in cold water-containing liquids. The presence of maltodextrin is essential for obtaining this result. Maltodextrin is a hydrophilic compound and easily dissolves in water-containing media. The random distribution of the maltodextrin in the agglomerated starch-based product permits the water to penetrate rapidly into the particles. Due to this rapid penetration of liquid, said agglomerated starch-based product is readily dispersible without forming lumps.

On the other hand, maltodextrin is a polymeric hydrophilic compound and due to its polymeric structure building of viscosity is enhanced, and setting time is reduced. Consequently, the agglomerated starch-based product develops its full viscosity while dispersing the agglomerated starch-based product into a cold water-containing liquid medium.

Other starch-based products such as blends of pregelatinised starch and hydrophilic compounds can be readily dispersed in cold water-containing liquid medium but they show a delay in developing their full viscosity.

By applying the agglomerated starch-based product of the present invention instead of these other starch-based products, the time needed for developing full viscosity is reduced with at least 10%, preferably with at least 20%, more preferably with 30%. This gain of time for developing full viscosity is applicable in any cold water-containing medium.

The present invention relates to an agglomerated starch-based product characterised in that its full viscosity in cold milk is developed in less than 10 minutes, preferably in less than 8 minutes, more preferably in less than 5 minutes. Normally, the development of viscosity is dependent on the medium wherein the agglomerated starch-based product is dispersed and it further depends on the temperature. The development of full viscosity of the agglomerated starch-based product in warm water (40° C.) is instantaneous, and development of its viscosity in cold water only needs a few seconds. Cold milk is one of the more difficult media for developing full viscosity, and this medium is used for the measurement of time needed to develop full viscosity, and it is further used for the characterisation of the agglomerated starch-based product. The development of viscosity is measure with a Brookfield texture analyser.

Figure 3:
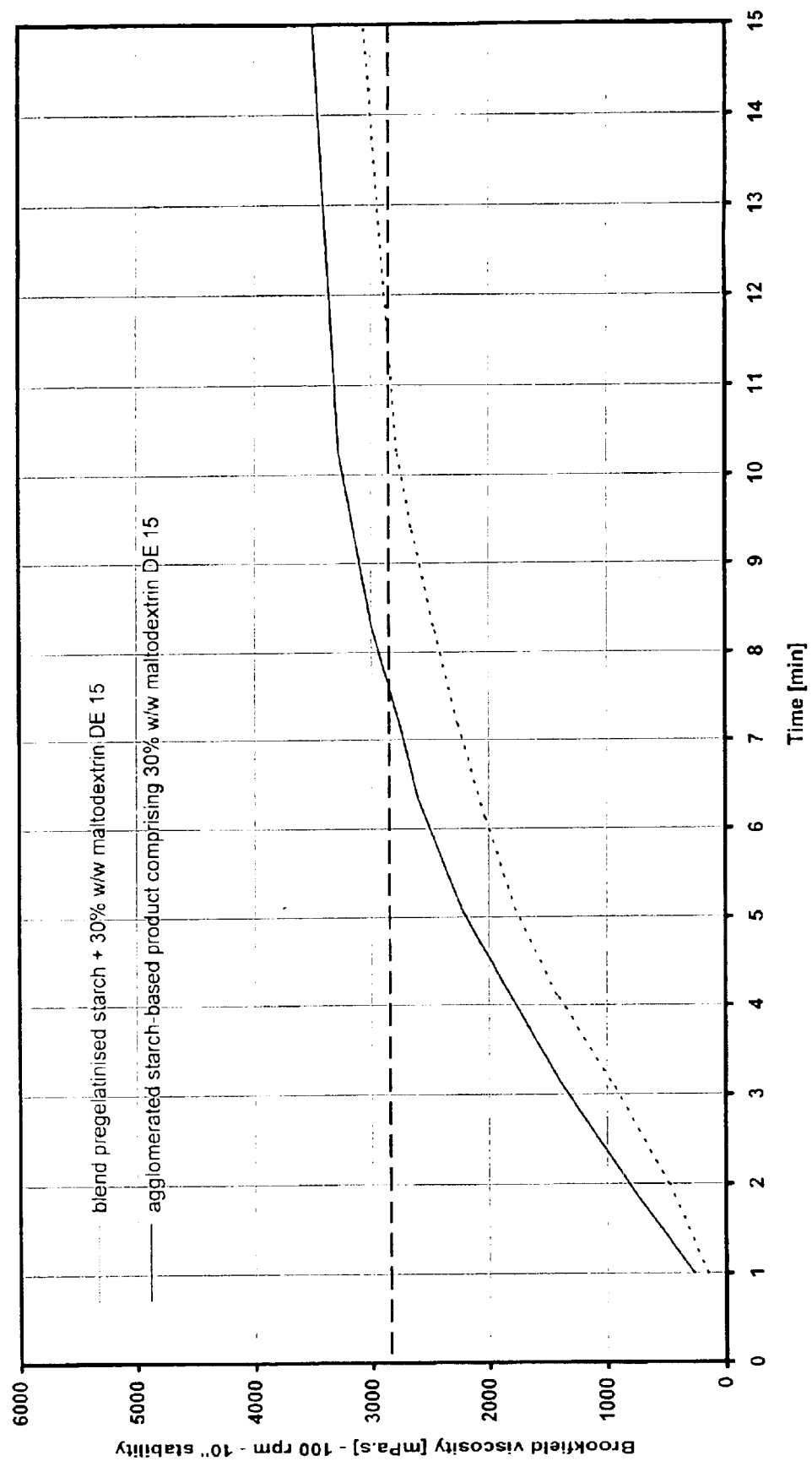
FIG. 3 is a graph showing the viscosity development of an instant pudding, comprising the agglomerated starch-based product comprising 30% maltodextrin DE 15, measured with a Brookfield viscosity analyser after setting time of 2, 5, 7, 12 and 15 minutes. Full viscosity is developed in less than 8 minutes. The profile is compared with the viscosity development of an instant pudding comprising a normal blend of pregelatinised starch and 30% maltodextrin DE 15. This pudding needs more than 10 minutes for development of the full viscosity.

FIG. 3 clearly demonstrates the significant difference between the agglomerated product of the current invention and a blend of pregelatinised starch and maltodextrin for developing its full viscosity in cold milk. The full viscosity of an instant pudding, comprising the agglomerated starch-based product consisting of starch and 30% maltodextrin DE 15, is developed in less than 8 minutes, while the viscosity development of an instant pudding comprising a normal blend of pregelatinised starch and 30% maltodextrin DE 15 needs more than 10 minutes.

Moreover, the agglomerates have sufficient strength to resist friction during the conveying and blending that is normally experienced by dry food mix ingredients.

The starch used in the present invention may be native starch from a variety of sources such as corn, waxy maize, potato, rice, wheat, cassava, sorghum starches, and/or modified starches, such as thin-boiled starches, oxidised starches, starch esters, starch ethers and/or mixtures thereof.

Maltodextrin is a glucose polymer with a dextrose equivalent (DE) of less than 20, preferably a maltodextrin with DE not higher than 16, more preferably with DE of from 5 to 15 is applied.

Maltodextrin is present in an amount of from 5% w/w to 95% w/w on dry base of the agglomerated starch-based product, preferably from 10% w/w to 75% w/w, and more preferably from 15% w/w to 50% w/w, most preferably in an amount of from 15% w/w to 40% w/w.

The higher the quantity of starch in the agglomerated starch-based product the more expressed the thickening properties of the agglomerated starch-based product. In case maltodextrin is present in much higher levels than starch, the agglomerated starch-based product is readily dispersible but its thickening properties are not so expressed, due to the low level of starch present. Each combination of a typical starch product (native or modified) with maltodextrin has an optimum weight ratio of starch to maltodextrin wherein the dispersibility and the development of the full viscosity of the agglomerated starch-based product are optimal and simultaneous.

The agglomerated starch-based product can be produced by spray-cooking, roll-drying or agglomeration in fluid bed dryer, preferably by spray-cooking.

In case the agglomerated starch-based product is prepared by spray-cooking of unmodified (native) or modified starch and maltodextrin, an apparatus such as is described in U.S. Pat. No. 4,280,851, is applied.

An aqueous starch slurry is sprayed through an atomisation aperture in the nozzle, where the starch is gelatinised by being subjected to high temperature in the presence of moisture. On exiting the nozzle vent aperture, the resulting pregelatinised starch is in a finely sized atomised state. Maltodextrin is injected in the top of the tower in such a way that the trajectory of the dry powder crosses the spray pattern of the spray-cooked nozzle in order to produce agglomerated particles.

The agglomerated starch-based product is easily dried in the spray-drying tower and subsequently brought into an external fluid bed. The product from the fluid bed was sieved in a sifter and the oversized fraction was disrupted in a mill. The agglomeration and the particle size distribution of agglomerated starch-based product can be controlled by the nozzle configuration and by the application of a sifter and a suitable mill to screen off and to mill an oversized fraction. The average particle size is closely related to the aperture of the top screen to be used in the sifter. The dried powder is recuperated in bags. The agglomerated starch-based product wherein at least 80% w/w of the discrete particles are bigger than 100 microns, is characterised in that each particle is an agglomeration of randomly distributed fine grains of starch and maltodextrin.

Furthermore, the process parameters are correlated to the type of starch and the weight ratio of starch to maltodextrin.

The process for preparing these agglomerated starch-based products is characterised in that the spray-drying tower inlet temperature, steam pressure, and the correct ratio of steam to starch slurry (weight steam/weight starch slurry) is selected.

The weight ratio of steam to starch slurry is within the range of 0.1 to 3. The steam pressure is higher than 5 bar, and the tower inlet temperature is between 150° C. and 250° C.

For preparing agglomerated starch-based product based on starch (C☆Tex$^R$ 06209) and 30% w/w maltodextrin DE 15 (C☆Pur$^R$ 01915), the weight ratio of steam to starch slurry is about 0.6 while the vapour pressure is about 10 bar at a steam flow rate of 370 kg per hour. The spray-drying tower had an inlet temperature of about 200 to 250° C. and an outlet temperature of about 85 to 100° C.

The current invention further describes dry mixes for making food preparations containing an agglomerated starch-based product consisting of starch and maltodextrin with at least 80% w/w of the discrete particles of said agglomerated starch-based product greater than 100 microns, wherein each particle is an agglomeration of randomly distributed fine grains of starch and maltodextrin, and said agglomerated starch-based product instantly disperses and simultaneously develops its full viscosity in a cold water-containing liquid medium.

The invention further relates to dry mixes comprising the agglomerated starch-based product in an amount of from 10% w/w and 99% w/w, preferably from 10% w/w and 95% w/w, more preferably from 10% w/w to 80% w/w on dry base. Besides the agglomerated starch-based product, these dry mixes may contain sweetening agents, emulsifiers, colorants, flavors, and mixtures thereof.

These dry mixes are suitable for making food compositions which are selected from the group consisting of instant bakery products, dairy products, instant sauces, soups, instant desserts and drink powders. Particularly the dry mixes of the current invention are useful for any application wherein the rapid dispersibility and the rapid (=direct, instantaneously) development of full viscosity is an issue. Particularly the dry mixes of the current invention can be applied for any food composition comprising starch and maltodextrin.

In particular, the current invention relates to dry pudding mixes wherein the dry mix is comprising from 20% w/w to 80% w/w agglomerated starch-based product, preferably from 40% w/w to 80% w/w, more preferably from 50% w/w to 60% w/w, and said agglomerated starch-based product comprises from 15% w/w to 40% w/w maltodextrin.

The current invention presents at least two main advantages. First of all the convenience is increased as this is more and more demanded by an increasing population. While up to now the preparation of instant food composition based on cold milk still needed a significant setting time of more than 10 minutes, before the full viscosity has been developed, applying the agglomerated starch-based product for preparing instant food compositions has significantly reduced this waiting or setting time. Less than 8 minutes are needed before viscosity of the corresponding food composition in cold milk is fully developed. This corresponds to a gain in time of 30%. In fact, the normal setting time and refrigeration of food preparations with instant mixes can be eliminated and after mixing the dry mix of the current invention with the aqueous liquid the finished product can directly be consumed.

Secondly, the dry mix composition is simplified. The current invention provides the two main components of these dry mixes, such as a starch-based product and maltodextrin, as a homogeneous powder, i.e. the agglomerated starch-based product of the current invention. Such a homogeneous powder improves simplicity of the dry mix formulation and convenience. Moreover, the risk of segregation during storage and transport is reduced to a minimum by using a homogeneous powder of agglomerated starch-based product.

In addition, by applying the agglomerated starch-based product, the finished products have a smooth and creamy texture which is comparable to products prepared by stovetop cooking. The finished products are devoid of any lumping or grainy dispersions.

The dry mixes based on agglomerated starch-based product give after adding a liquid such as water and/or milk, the finished products instantaneously in water or in less than 8 minutes in cold milk, and said products can directly be consumed and have a similar texture, appearance, and gel structure as compositions based on cooked starch.

Taste panels confirm that the instant puddings comprising the agglomerated starch-based product have smooth and creamy texture comparable with a stovetop cooked pudding.

The invention is illustrated by way of the following examples.

EXAMPLE 1

The agglomerated starch-based product was prepared by spray-cooking in a wide body spray-drier SF.

A starch (C☆Tex 06209) slurry containing 38% dry solids was pumped into the nozzle at a rate of 600 kg per hour at a temperature of 20° C. Steam, as the heating medium at a pressure of 10.2 bar, was being pumped in the nozzle at an estimated flow rate of 371 kg per hour. The spray-drying tower had an inlet temperature of about 225° C. and an outlet temperature of about 96° C., while the flow-rate of air was about 7900 kg per hour.

On exiting the nozzle vent aperture, the pregelatinised starch was in a finely sized atomised state. Dry maltodextrin DE 15 (C☆Pur 01915) (30% w/w of total agglomerated starch-based product) was injected in the top of the tower in such a way that the trajectory of the dry powder crossed the spray pattern of the spray-cooked nozzle for producing agglomerated starch-based product. The agglomerated particles were easily dried in the spray-drying tower and recuperated in an external fluid bed. The product coming from the fluid bed was sifted in a sifter of 600 microns and the oversize fraction was disrupted in a mill. The dried agglomerated starch-based product had a granulometry wherein at least 80% w/w of the discrete particles are bigger than 100 microns.

Figure 2:
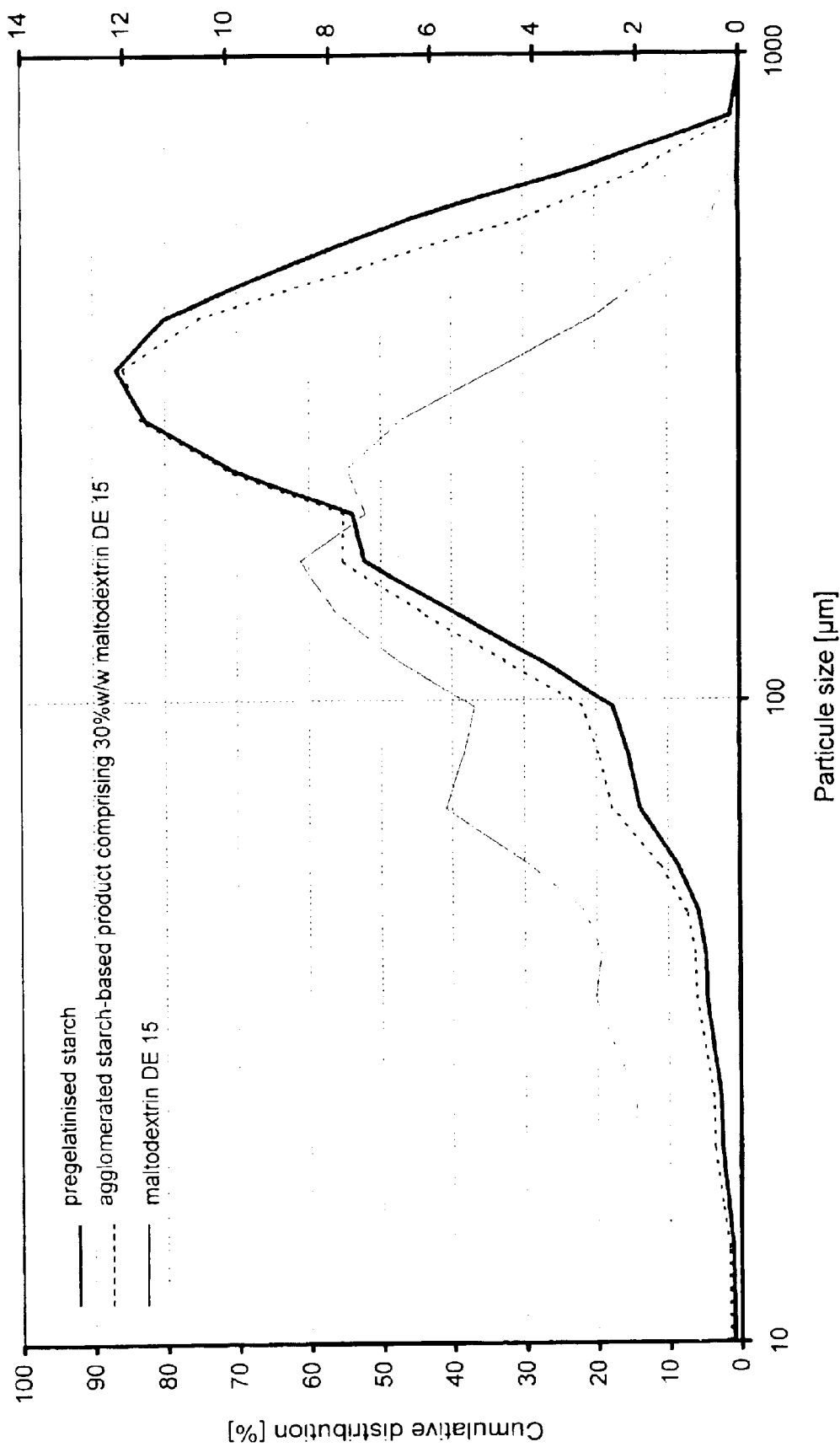
FIG. 2 is a graph of the particular size distribution of agglomerated starch-based product comprising 30% maltodextrin DE 15. The particle size distribution is similar to the distribution of the starch product, while the maltodextrin product gives a different distribution. It is clearly seen that the particle size distribution of the agglomerated starch-based product is not just the sum of the curves from starch and maltodextrin.

The product thus obtained has a structure as can be seen in FIG. 1. The particle size distribution is seen in FIG. 2.

EXAMPLE 2

The agglomerated starch-based product based on starch (C☆Tex 06209) and maltodextrin DE 15 (C☆Pur 01915) 70/30 w/w, prepared according to the process described in example 1 was applied in a pudding mix.

The pudding mix was prepared with the following ingredients (expressed as weight %):

| | |
|---|---|
| Agglomerated starch-based product | 60.0 |
| Sucrose | 40.0 |
| Flavours and colours (Vanilla, cocoa . . . ) | q.s. |

The dry pudding mix was prepared by blending the ingredients. The pudding was prepared in glass bowls by adding 25 grams of the pudding mix to 200 ml of cold milk. Stirring was applied during addition of powder and continued for about 20 seconds. The bowl was stored at room temperature and viscosity was evaluated after 2 minutes, 5 minutes, 7 minutes, 12 minutes and 15 minutes.

The viscosity development is shown in FIG. 3.

What is claimed is:

1. An agglomerated starch-based product consisting of starch and maltodextrin wherein at least 80% w/w of the discrete particles of said agglomerated starch-based product are greater than 100 microns, and characterised in that:
    a) each particle is an agglomeration of randomly distributed fine grains of starch and maltodextrin, and
    b) said agglomerated starch-based product instantly disperses and simultaneously develops its full viscosity in a cold water-containing liquid medium.

2. The agglomerated starch-based product according to claim 1, characterised in that its full viscosity in cold milk is developed in less than 10 minutes.

3. The agglomerated starch-based product according to claim 1 or 2, characterised in that maltodextrin is present in an amount of from 5% w/w to 95% w/w on dry base of the agglomerated starch-based product.

4. A dry mix for making food preparations characterised in that the dry mix comprises an agglomerated starch-based product consisting of starch and maltodextrin and at least 80% w/w of the discrete particles of said agglomerated starch-based product are greater than 100 microns, and wherein each particle is an agglomeration of randomly distributed fine grains of starch and maltodextrin, and said agglomerated starch-based product instantly disperses and simultaneously develops its full viscosity in a cold water-containing liquid medium.

5. The dry mix according to claim 4, characterised in that the dry mix contains said agglomerated starch-based product in an amount of from 10% w/w and 99% w/w.

6. Food compositions containing a dry mix according to claim 4 or 5, characterised in that the food compositions are selected from the group consisting of instant bakery products, dairy products, instant sauces, soups, instant desserts and drink powders.

7. A dry pudding mix containing a dry mix according to claim 4 or 5, characterised in that said dry mix comprises from 20% w/w to 80% w/w agglomerated starch-based product and said agglomerated starch-based product comprises from 15% w/w to 40% w/w maltodextrin.

8. The agglomerated starch-based product according to claim 2, wherein said agglomerated starch-based product develops its full viscosity in cold milk in less than 10 minutes.

9. The agglomerated starch-based product according to claim 2, wherein said agglomerated starch-based product develops its full viscosity in cold milk in less than 8 minutes.

10. The agglomerated starch-based product according to claim 2, wherein said agglomerated starch-based product develops its full viscosity in cold milk in less than 5 minutes.

11. The agglomerated starch-based product according to claim 3, wherein said maltodextrin is present in an amount of from 10% w/w to 75% w/w.

12. The agglomerated starch-based product according to claim 3, wherein said maltodextrin is present in an mount of from 15% w/w to 50% w/w.

13. The agglomerated starch-based product according to claim 3, wherein said maltodextrin is present in an amount of from 15% w/w to 40% w/w.

14. The agglomerated starch-based product according to claim 3, wherein said agglomerated starch-based product develops its full viscosity in cold milk in less than 8 minutes.

15. The agglomerated starch-based product according to claim 3, wherein said agglomerated starch-based product develops its full viscosity in cold milk in less than 5 minutes.

16. The dry mix according to claim 4, wherein the dry mix contains said agglomerated starch-based product in an amount of from 10% w/w to 95% w/w.

17. The dry mix according to claim 4, wherein the dry mix contains said agglomerated starch-based product in an amount of from 10% w/w to 80% w/w.

18. The dry pudding mix according to claim 7, wherein said dry mix comprises 40% w/w to 80% w/w of said agglomerated starch-based product.

19. The dry pudding mix according to claim 7, wherein said dry mix comprises 50% w/w to 60% w/w of said agglomerated starch-based product.

20. A dry food mix that contains 10% w/w and 99% w/w of an agglomerated starch-based product wherein said agglomerated starch-based product consists of a homogeneous powder of discrete particles that are agglomerates of randomly distributed fine grains of starch and maltodextrin, at least 80% w/w of said discrete particles are greater than 100 microns but less than 1000 microns, said maltodextrin having a dextrose equivalent (DE) of up to 20, said agglomerated starch-based product contains from 5% w/w to 95% w/w on dry basis of maltodextrin, and said agglomerated starch-based product instantly disperses and simultaneously develops its full viscosity in a cold water-containing liquid medium.

* * * * *

UNITED STATES PATENT AND TRADEMARK OFFICE
CERTIFICATE OF CORRECTION

PATENT NO. : 6,858,245 B2
DATED : February 22, 2005
INVENTOR(S) : De Coninck

It is certified that error appears in the above-identified patent and that said Letters Patent is hereby corrected as shown below:

<u>Column 8,</u>
Line 2, "fall" should read -- full --
Line 48, "mount" should read -- amount --

Signed and Sealed this

Thirty-first Day of May, 2005

JON W. DUDAS
*Director of the United States Patent and Trademark Office*